(12) United States Patent
DaCosta

(10) Patent No.: US 7,979,447 B2
(45) Date of Patent: Jul. 12, 2011

(54) METHOD AND APPARATUS FOR USE IN PROVIDING INFORMATION TO ACCESSING CONTENT

(75) Inventor: Behram DaCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 482 days.

(21) Appl. No.: 12/016,906

(22) Filed: Jan. 18, 2008

(65) Prior Publication Data

US 2009/0187575 A1 Jul. 23, 2009

(51) Int. Cl.
*G06F 7/00* (2006.01)
*G06F 17/30* (2006.01)
(52) U.S. Cl. .................................. 707/754; 707/758
(58) Field of Classification Search .................. None
See application file for complete search history.

(56) References Cited

U.S. PATENT DOCUMENTS

| 6,003,030 A | * | 12/1999 | Kenner et al. | 707/999.01 |
| 7,650,376 B1 | * | 1/2010 | Blumenau | 709/203 |
| 2001/0056374 A1 | * | 12/2001 | Joao | 705/14 |
| 2002/0026440 A1 | * | 2/2002 | Nair | 707/3 |
| 2002/0040326 A1 | * | 4/2002 | Spratt | 705/26 |
| 2005/0071323 A1 | * | 3/2005 | Gabriel et al. | 707/3 |
| 2005/0193335 A1 | * | 9/2005 | Dorai et al. | 707/102 |
| 2010/0121714 A1 | * | 5/2010 | Bovenschulte et al. | 707/769 |

FOREIGN PATENT DOCUMENTS

WO     IB-0122725     3/2001

* cited by examiner

*Primary Examiner* — Mohammad Ali
*Assistant Examiner* — Kannan Shanmugasundaram
(74) *Attorney, Agent, or Firm* — Fitch, Even, Tabin & Flannery

(57) ABSTRACT

The present embodiments provide methods, apparatuses, and systems for use in identifying one or more sources of content by receiving a request to supply a listing of registered content providers; identifying a first registered content identifier (ID); evaluating a first metadata directly associated with the first registered content ID, and identifying multiple registered content providers; identifying, for each identified content providers, a cost to access the first content, and a link to access the corresponding content provider; generating a listing of content providers comprising a list of each of the identified content providers and their corresponding costs and links; and communicating over the distributed network the listing of content providers.

16 Claims, 9 Drawing Sheets

METHOD AND APPARATUS FOR USE IN PROVIDING INFORMATION TO ACCESSING CONTENT

FIELD OF THE INVENTION

The present invention relates generally to networked information about content, and more particularly to providing users with information about accessing content.

BACKGROUND

There are numerous sources, including for example, the Internet, television programming guides and other sources of information, that provide users with vast array of information and resources to search for desired movies, music, images, pictures, graphics and other such content. As such, users can search these resources in attempts to identify a desired content, such as multimedia content (e.g., a movie).

Often these resources additionally provide information about contacting a resource to acquire or gain access to desired content. Further, these resources provide additional information about products, services and other multimedia that may be related to the desired content but are not the desired content.

SUMMARY OF THE EMBODIMENTS

The present invention advantageously addresses the needs above as well as other needs through the provision of the methods, apparatuses, and systems for use in providing listings of content providers from which a user can access desired content. Some embodiments provide methods for use in identifying one or more sources of content. These methods electronically receive, from over a distributed open network at a listing service provider, a request to supply a listing of content providers that are registered as sources for content; identify a first registered content identifier (ID) corresponding exclusively with a first content and registered with the listing service provider; evaluate a first metadata of the listing service provider where the first metadata is directly associated with the first registered content ID, and identify from the first metadata multiple content providers registered with the listing service provider as sources to provide to one or more users the first content that corresponds with the first registered content ID; identify, for each of the multiple identified content providers, a cost to a user to access the first content, and a link over the distributed network to access the corresponding content provider; generate a listing of content providers comprising a list of each of the identified multiple content providers and their corresponding costs and links; and communicate over the distributed network the listing of content providers that are registered as sources to distributed the first content.

Other embodiments provide methods of identifying sources from which multimedia content is to be accessed. These methods receive a request, from over a distributed communication network, to identify content providers configured to provide access to a multimedia content; identify, in response to the received request, a single unique registered content identifier (ID) directly corresponding to the requested multimedia content; identify from a plurality of registered content providers one or more registered content providers registered in association with the registered content ID to provide users with access to the multimedia content directly corresponding to the registered ID; identify, in response to identifying the one or more registered content providers, for each of the identified content providers one or more costs to access the multimedia content from each of the identified registered content providers, and a method of a user to access each of the respective identified registered content providers such that the user can access the multimedia content from the respective content provider; generate a listing of content providers comprising a listing of the identified registered content providers identified as providing access to the multimedia content, and corresponding with each of the identified registered content providers the corresponding one or more costs to access the multimedia content from the corresponding registered content provider and the method of accessing the corresponding registered content provider; and communicate over the distributed communication network the generated listing of content providers, whereby the listing of content providers is configured to be utilized by a requester to access the multimedia content from one or more of the identified registered content providers listed in the listing of content providers.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
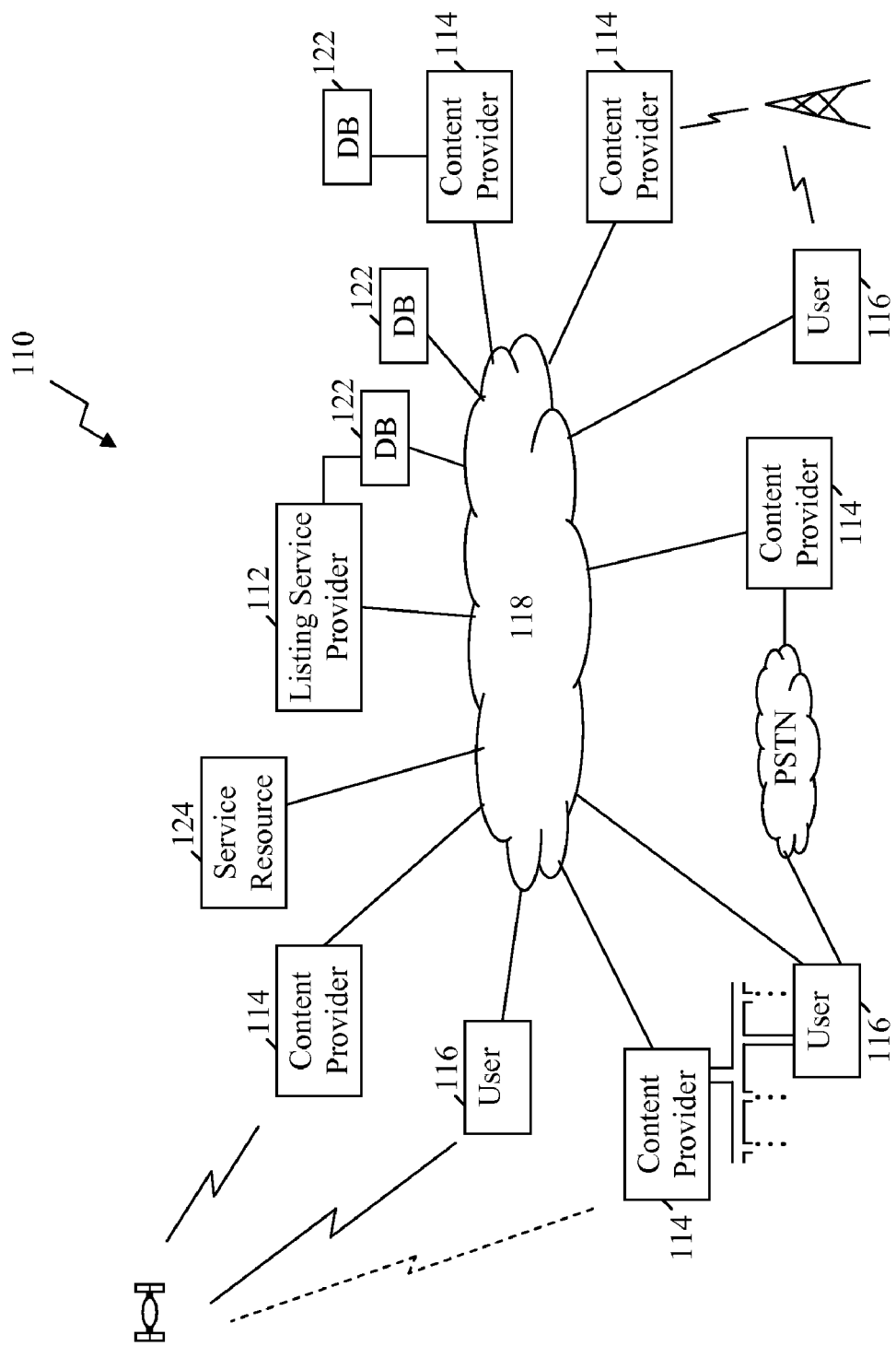
FIG. 1 depicts a simplified block diagram of a system according to some embodiment that provides listings of content providers in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiment provides methods and systems for use in identifying remote sources of content, such as multimedia content and other such content, and accessing and/or acquiring the content from the remote sources and/or content providers. A desired content can be uniquely identified and based on the identified content a list of one or more content providers can be generated along with corresponding costs for a user to access or retrieve the content. The listing of available content providers is generally restricted to those content providers that have registered with a listing service provider as a source for accessing the content associated with the unique content identifier. In identifying both content providers and corresponding costs or prices, users can comparatively shop and evaluate sources of content to obtain a best price relative to a user's criteria and/or conditions.

In many instances it can be difficult for users to locate desired content (e.g., audio/video content, audio content video content, images, graphics and other such multimedia content) and/or sources of content. For example, when a user would like to view the movie "Spider-man," it may be difficult for the user to determine how she/he may gain access to or acquire the content. Many different sources may be available from which the content can be acquired, and many different types of content or types of delivery may also be available, such as but not limited to video-on-demand (VOD) via cable or satellite TV service, available on the Internet (e.g., MovieLink), available via a portable storage medium (e.g., a digital versatile disc (DVD) that can be rented (e.g., Blockbuster™, Netflix™ or the like), via free broadcast, or from other locations. Identifying pricing for the different methods of delivery and comparatively shopping for the desired content can also be difficult.

The present embodiments, however, provide methods and services for supplying users with information about acquiring or gaining access to content. This service may be, for example, implemented from a location on the Internet that provides information in response to a query. Users can query the service for sources of content. Based on an identification of the content, a listing service provider can return a listing of one or more sources or providers of the content.

FIG. 1 depicts a simplified block diagram of a system 110 according to some embodiment. The system comprises a listing service provider 112, one or more content providers 114, one or more user devices 116 and a distributed open communication network 118. Some embodiments further include one or more databases and/or remote data storage devices 122, one or more service resources 124, and/or other such devices or sub-systems.

The listing service provider 112 couples with the communication network 118 (and/or other networks) and communicates with the content providers 114 and user devices 116 over the communication network 118. The communication network 118 is a distributed communication network that can include substantially any relevant communication network(s) such as the Internet, an intranet, a public switching telephony network (PSTN), a cable network, a satellite network, a wireless communication network and other such networks or combinations of such networks. Typically, the network 118 is an open network with numerous sources of content and competing sources of content.

The listing service provider 112 can be implemented through a computer, server or other such relevant device. For example, the listing service provider can be implemented through a server employing one or more processors that access memory to run software that configures one or more processors to provide the functionality as described below. Similarly, the user devices 116 can be substantially any device having access to the communication network 118. Typically, these devices have processors and memory that stores software, data and content, where the software is implemented by the processor to provide the desired functionality. For example, the user device can be a computer, cell phone, personal digital assistant, audio player, video player, set-top-box, television, and other such devices and/or consumer electronic devices.

As described above, the system 110 allows a user to identify one or more content providers and to potentially access or acquire the content from a content provider 114. In attempting to acquire a desired content a user through the user device 116 queries the listing service provider 112 for sources of a desired content. The query may refer to the item either by name, by a universal identifier that has been assigned to the item, other reference mechanism, and/or other such identification. The identification or reference of the content may have been obtained from the service itself (e.g., a directory and/or catalog of available and/or registered content) from a third party list of content (e.g., guide to Hollywood movies of the 21st century), or other such source. The user may additionally provide other information to the listing service provider 112, for example, the physical location of the user device 116 (e.g., San Francisco, Calif.) for content licensing/distribution reasons; the location of the user device 116 on the distributed network 118 (e.g., an Internet Protocol (IP) address of the user device 116) that may be used by the listing service provider 112, for example, to aid in determining one or more costs of delivering the content to the user; profile of the user (which may be used to determine types of value of advertisements delivered in the content, types of content that can be delivered and/or played back, method of delivery, age appropriateness of advertising, willingness of the user to watch advertisements and number thereof, services to which the user device 116 has access (e.g., ATT IPTV service, Cox Cable service and the like); and other such information.

In some instances, upon accurately identifying the desired content in response to a user request the listing service provider 112 identifies those content providers 114 that have registered with the listing service provider as a source for the identified content. In some embodiments, a unique content identifier (ID) is employed to accurately and precisely identify the content attempting to be accessed by the user. The unique content ID typically is issued through a third party. For example, a content owner can register the content with the third party and the third party can issue the unique content ID. This registration can be employed for each different content and/or for each different format of a content so that content can be uniquely identified. In some instances, however, the listing service provider 112 can alternatively or additionally be a source for registering content and issuing content IDs. The unique content IDs can be issued on a content by content basis. In other instances, blocks of unique content IDs can be issued to an owner of multiple content and/or a creator of content (e.g., a movie studio, a music label or other such content creators can be issued a block of unique content IDs). The content creator can then assign unique content IDs from the block of content IDs to content and/or different formats of content as they are created, produced and/or finalized for distribution. Additionally in some instances, the content creator upon assigning a content ID may notify the third party and/or listing service provider 112 of the use of the content ID and the content to which it was assigned.

In some embodiments, content providers 114 register with the listing service provider 112 as sources for one or more content, such as multimedia content or other relevant content. Further, the content is associated exclusively with a content identifier (ID), which in some implementations is a globally unique content ID. These content IDs allows the listing service provider 112 to distinguish between content, simplifies the locating of sources of content, limits and potentially avoids providing irrelevant or non-desired content.

The listing service provider 112 creates and/or has one or more listings of content and content providers. Typically, the listing service provider does not store or provide access to the content. Instead, the listing service provider 112 maps the referenced identified content to spatio-temporal locations where the identified content may be found (with spatio-temporal defining space and time, e.g., space is on an Internet site, such as, "www.comcast.net"; at a specified time, such as "9 PM, Jul. 23, 2009," "after 9 PM, Jul. 23, 2009," "between Jul. 23, 2009 and Aug. 23, 2009," "anytime" or other such designated time). Various content providers 114 may register content and/or may register as a source for identified content with the listing service provider 112. Registering with the listing service provider 112 may increase the likelihood that a content provider 114 will be located as a source of content by prospective users/viewers, provide an ability to search for content from a provider that does not provide an ability to search for content (e.g., many content provider databases may not be generally accessible), provide an ability to search for content from a provider whose content listings are not readily searchable (such as, electronic programming guides), and the like.

The listing service provider 116 in response to a query from a user device 116 identifies content providers associated with an identified content and costs associated with the content. In some instances, when the listing service provider 112 is queried through a user device 116, the listing service provider contacts or calls back the content provider 114 to get further details regarding access and/or delivery cost and options for a particular user, which may taking into account information from a user profile and/or information that the user has provided (e.g., location on the Internet, services the user has subscribed to, willingness to view advertisements, etc.).

As described above, the listing service provider 112 can be implemented through a computer, server or other such relevant devices, and includes a computer readable memory and/or accesses a local or remote memory storage (e.g., database 122). In the memory the listing service provider 112 stores the unique content IDs and associates those content IDs with one or more content providers 114 registered with the listing service provider 112 as a source for the content associated with the unique content IDs. Typically, the listing service provider 112 does not store or access the content for which a user is searching. Instead, the listing service provider 112 returns a listing of content providers 114 to the requesting user and identifies one or more appropriate ways or methods of contacting the content providers 114. The user can then contact the content provider 114 to gain access to and/or acquire the desired content associated with the unique content ID.

Figure 2:
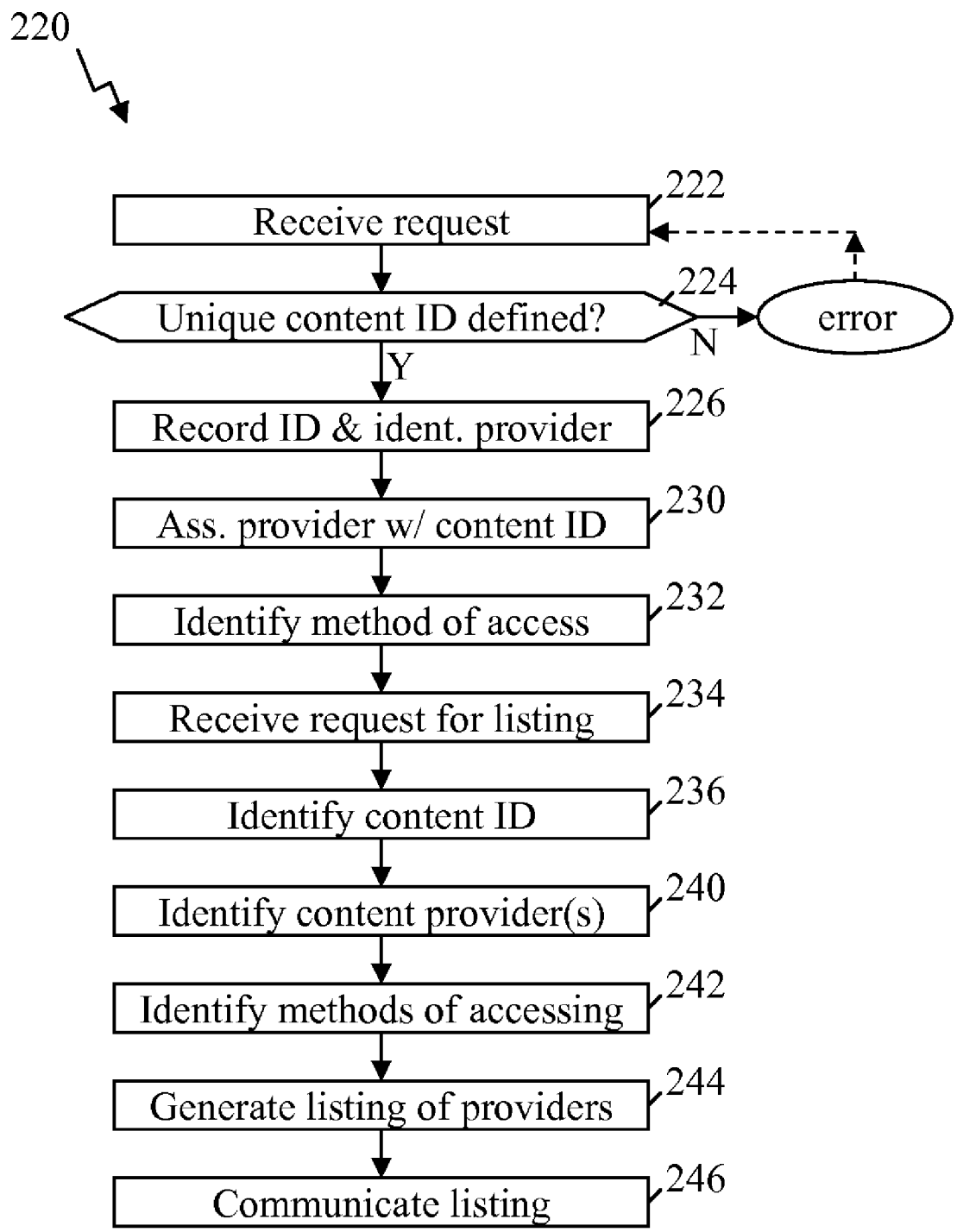
FIG. 2 depicts a simplified general flow diagram, according to some embodiments, of a process according to some embodiments to communicate to a user device a listing of potential content providers from which a user can access and/or acquire desired content.

FIG. 2 depicts a simplified general flow diagram of a process 220 according to some embodiments to provide to a user device 116 a listing of potential content providers 114 from which a user can access and/or acquire desired content. In step 222, a request is received at the listing service provider 112 to register a content provider 114 as a source for providing access to content. In step 224, it is determined whether a unique content ID is defined for the content. In those instances where a unique content ID is not identified an error is return to the content provider 114. This error can instruct the content provider to provide the content ID, acquire a unique content ID (e.g., from a third party that generates globally unique IDs from multimedia content and/or other content), and/or can notify the content provider 114 that a unique content ID can be acquired by the listing service provider. As is fully described below, the listing service provider 114 can be one or an exclusive source for providing unique content IDs.

When it is determined in step 224 that a content ID is defined, step 226 is entered where the unique content ID is recorded, an identification for the content provider (content provider ID) is determined and a cost for a user to access the content is determined. Typically, this content provider ID also is unique and distinguishes the content provider from other content providers. In step 230 the registered content provider ID is recorded and associated with the unique content ID. In step 232, one or more methods of contacting the content provider 114 is identified, and the cost and methods of access the content are recorded and associated with the content ID and content provider ID. The methods of contacting the content provider 114 can include web site links, phone numbers, universal resource locators (URL), addresses of one or more retail outlets where a user can visit to get content, and/or substantially any other methods of contacting. Additionally, the contact method can be substantially any addressable entity on a network, of which Internet addresses are one type. Other methods of access may be service providers, e.g. "Comcast Cable, zip 92112-3234", which is not a contact method but a reference to the service provider.

In step 234, a request is received from a user device 116 requesting a listing of content providers that are configured to provide access to a desired content as designated by the user. The designation of the desired content can be based on the user providing the unique content ID, entering search terms that that listing service provider 112 uses in searching in an attempt to locate the desired content, specifying a title of desired content, making a selection from a listing of content, and other such designations as further described below. In step 236, a unique content ID is identified for the requested content, where the content ID is exclusively associated with the identified content. In step 240, one or more content providers 114 registered with the listing service provider 112 to provide a user with access to the specified content are identified. In step 242, one or more methods of accessing the desired content from each of the identified content providers are identified, and one or more costs associated with accessing the content are determined. In step 244, a listing is generated comprising the identified one or more registered content providers, associated one or more methods of contacting the listed content providers and associated costs in accessing and/or acquiring the desired content. In step 246, the listing is communicated to the requesting user device 116.

In providing the listing of potential content providers 114, a user can comparatively shop between potential content providers to identify a source for accessing and/or receiving the desired content. Because the listing identifies costs as well as methods of accessing the content a user can more readily make decisions about how to get the content and whether and/or how much cost is involved in accessing the content. Further, the listing of content providers is exclusively based on the unique content ID. As such, the present embodiments provide listings of providers that the user knows provides the specific content the user is interested in accessing. Other searching systems, such as a general search of the Internet provides listings of substantially any source remotely associated with the desired content, and even sources that are not associated with the desired content. For example, a search for the title of a movie in attempting to acquire access to the movie likely will include listings of parties that sell posters or other products associated with movies, spoofs of the movie, blogs and/or chat rooms about a movie, sources of related movies that may not provide the desired movie (e.g., sequels), and other such non-relevant products, information or services. Parsing through these listings of irrelevant sources to identify sources that actually provide the desired content can be difficult and time consuming, and a user may not even locate a content provider. Still further, trying to identify and compare costs and/or methods of accessing or receiving the content also adds further complexity to general searches, such as searches over the Internet.

Alternatively, the present embodiments limit listings to only providers that are specifically relevant to the desired content by, in part focusing the searching to the specifically selected content based on the unique content ID. Further, the listing is limited to those content providers registered as sources of providing the specifically identified content. Still further, a user can comparatively shop between potential content providers 114 because cost and methods of access are designated in a single listing.

Figure 3:
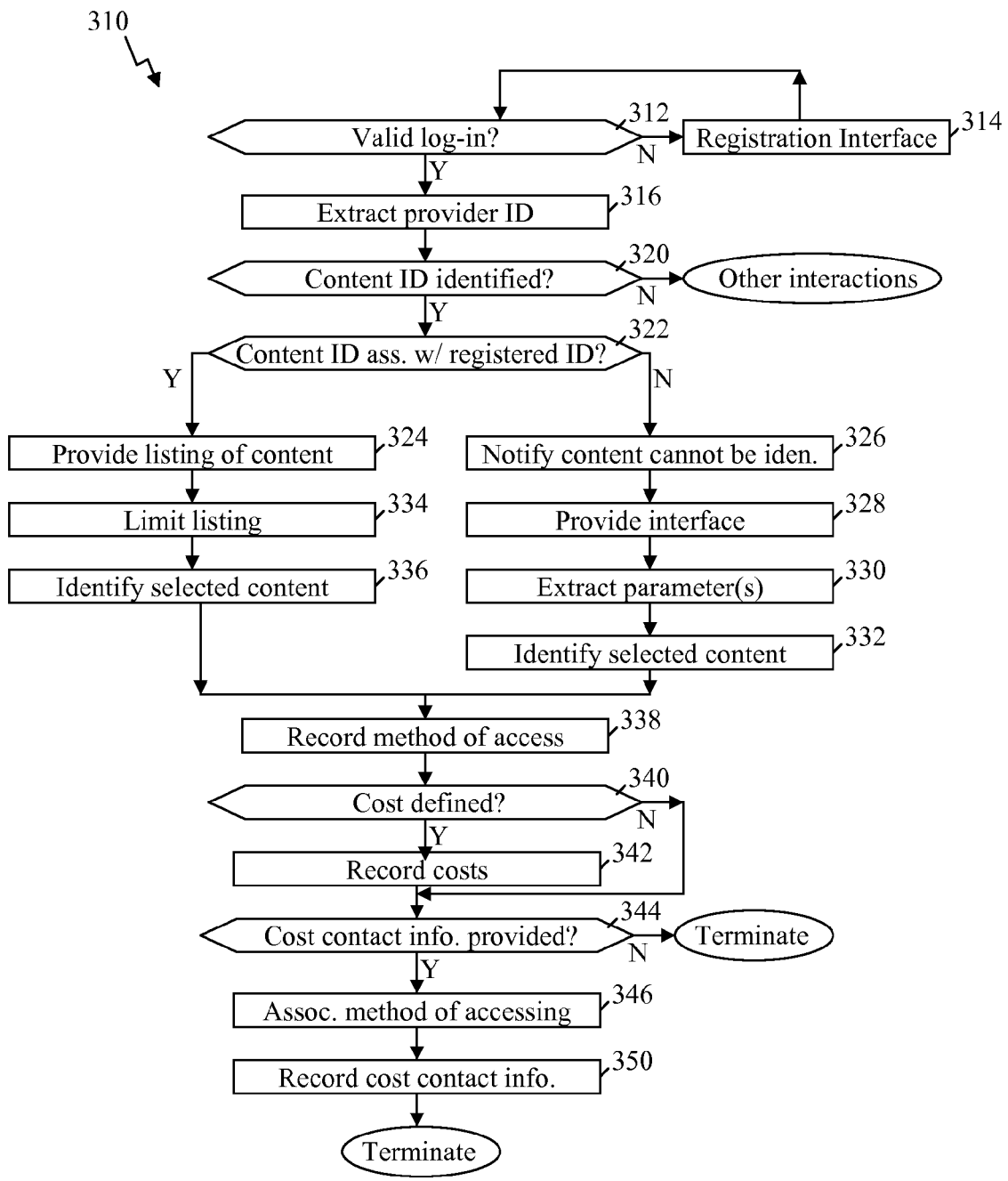
FIG. 3 depicts a simplified flow diagram of a process for use in registering content providers with a listing service provider that supplies listings of content providers.

FIG. 3 depicts a simplified flow diagram of a process 310 for use in registering content providers 114 with the listing service provider 112. In step 312 it is determined whether a content provider 114 validly logs into the listing service provider 112. In those instances where a valid log-in is not received a registration interface is provided (e.g., via a web page) to the content provider 114 in step 314 to allow the content provider to register with the listing service provider 112. Once a valid log-in is received, the process continues to step 316.

In step 316, the content provider identification is extracted from the request (e.g., name of provider, internet site address, etc.). In some embodiments, one or more passwords, unique ID, tokens, pins and/or other authentication are extracted and verified for the identified content provider. This authentication provides protection for the content provider and the content associated with the content provider. In step 320, it is determined whether a content is identified or specified (e.g., by title or other designation). A content may not be specified, for example, in instances where the content provider is managing a content provider portfolio, profile or account. For example, a content provider 114 may access an account or profile to adjust costs associated with one or more content for which the content provider previously registered as a source. When a content ID is not identified other appropriate actions are taken to allow the content provider to interact with the listing source provider 112, which may include an option to register as a provider for content which would request that the content provider identify a content ID returning the content provider to step 320.

In those instances where a content is specified, step 322 is entered where it is determined whether the identification or specification of the content can be associated with one or more known and/or registered unique content IDs. These known unique content IDs may be limited to content previously registered. Alternatively, a third party that issues unique content IDs can supply (for example periodically) listings of newly registered unique content IDs, and in some instances associated information of the content (e.g., title, content owner, distributor, etc.), that have been issued since a subsequent list was provided; the listing source provider 112 may be configured to issue unique IDs; or the like. When the specified content can be identified, step 324 is entered where a listing of one or more potential content is provided to the content provider from which the content provider can select and/or confirm. In some instances, this listing is provided through a content provider interface, which may be generated as a graphical user interface (GUI) or the like through which the user can interact and make selections. Following step 324, some embodiments include optional step 334 to determine whether the content provider attempts to further limit the listing of potential content. This limiting can be implemented, for example, as described below, and would then return to step 324 to provide a subsequent listing based on the limited listing. In step 336 one or more content selected by the user from the listing is identified.

When the specified content cannot be identified in step 322, optional step 326 is entered where the listing service provider 112 notifies the content provider 114 that a corresponding content cannot be identified, and may further request that the content provider acquire a unique content ID (e.g., from a third party, from the listing service provider 112, when the listing service provider is configured to issue unique content IDs, or other relevant source). Alternatively, in some embodiments, the process 310 includes optional steps that allow a user to search for the content for which the content provider is attempting to register as a source. In optional step 328, a content provider interface is provided to the content provider. The content provider interface, typically communicated in a web page or forwarded as a script or executable to be implemented at the content provider machine, can display a listing of content known to and/or registered with the listing service provider 112, and/or can provide options and/or files that allow the content provider to supply content information, such as title, genre, actor, director, date of release, format of content (e.g., high definition, standard, altered for television, etc.) or other such designations. In optional step 330 parameters are extracted from the information provided through the content provider interface and a search of previously registered content and/or listings of content associated with known unique IDs is performed, and a listing of content that potentially match the content provider designated criteria is generated. This listing and/or a sub-listing of content information is generated and provided to the content provider. Step 330 can be repeated, in some embodiments, one or more times to further focus or limit the listing of potential content. In optional step 332 a selected one of the content from the listing is received from the content provider 114. Based on the selected on of the content a unique content ID is determined that is exclusively associated with the selected content. The unique content ID is recorded, if not already recorded with the listing service provider, and metadata and/or other data is created and associated with the unique content ID such that the content provider identification is recorded within the metadata associated with the unique content ID. The below description continues to refer to the metadata associated with content IDs. It is noted that the metadata can be substantially any data, information, content, graphics, tables and the like that are associated with a content ID, and further the subject embodiments are not limited to metadata and instead can apply to substantially data, information, content, graphics, tables and the like that are associated with a content ID.

In step 338, one or more methods of allowing a user to access and/or acquire the content are received from the content provider, and recorded as part of the metadata associated with the unique content ID and the content provider identification. The method of providing access can be designated in the initial request, can be specified through the content provider interface or the like. Further, these methods as described above designate how users can acquire access to the identified content through the specific content provide, and the methods of accessing can include, but are not limited to, streaming, pay-per-view, satellite, physically purchase as a store location, and other such methods. In step 340, it is determined whether one or more costs are defined or specified for allowing a user to access the content through the content provider. In those instances where a cost is not designated the process 310 advances to step 344. Alternatively, where a cost is designated, step 342 is entered where a designated method of providing a user with access to the content associated with each of the designated costs is identified, recorded as part of the metadata of the associated unique content ID, and further associated with the corresponding methods of providing access as well as with the content provider identification. As such, a content provider may provide multiple ways for a user to access content, with potentially different costs associated with one or more of the different ways to access the content. For example, a first cost may be associated with streaming content, a second cost associated with pay-per-view, and a second cost for purchasing a portable storage medium that stores the desired content. Further in step 342 one or more criteria or parameters can be identified, in some embodiments, that are associated with a cost such that the associated cost is applicable when the criteria or parameter is satisfied. For example, a first cost may require that a user be willing to receive advertising, while a second cost (which, for example, may be more expensive than the first cost) does not require the advertising. In some embodiments, content providers can alter the cost information at a later time by logging-in to the listing service provider 112 (e.g., using a content provider user account that provides security for content and content providers) to alter or adjust the cost.

In step 344 it is determined whether cost contact information is provided to contact the content provider 114 to obtain cost information at the time a user is requesting a listing of content providers. The cost contact information typically includes an Internet site address that allows the listing service provider 112 to communicate with the content provider to acquire current cost information at the time a user requests a listing of content providers. Other methods of contacting the content provider, however, can also be employed. In some instances, the content provider could additionally or alternatively be contacted using a dedicated link that may be wired or wireless, or via packet switched (e.g., IP) or circuit switched (e.g., traditional phone lines) connections.

In step 346, it is determined which methods of providing access are associated with the one or more cost contact information. In step 350, the cost contact information is recorded as part of the metadata associated with the unique content ID, and further associated within the metadata with the content provider and one or more methods of providing access. The metadata is recorded at the listing service provider 112 and/or one or more databases 122. Again, in some instances the content information and/or metadata can be duplicated to multiple databases distributed over a geographic area (e.g., duplicated to multiple databases distributed across the United States or the world to limit demands on a single database), and/or may be distributed across multiple databases. Further, in some instances, a content provider may have to evaluate user profile information and/or request further information prior to determining pricing, or whether the content provider can even provide a user with access to the content. For example, the content provider may only have content available that includes advertising and in those instances where a user is not willing to view advertising the content provider would be unable to deliver desired content without advertising.

Figure 4:
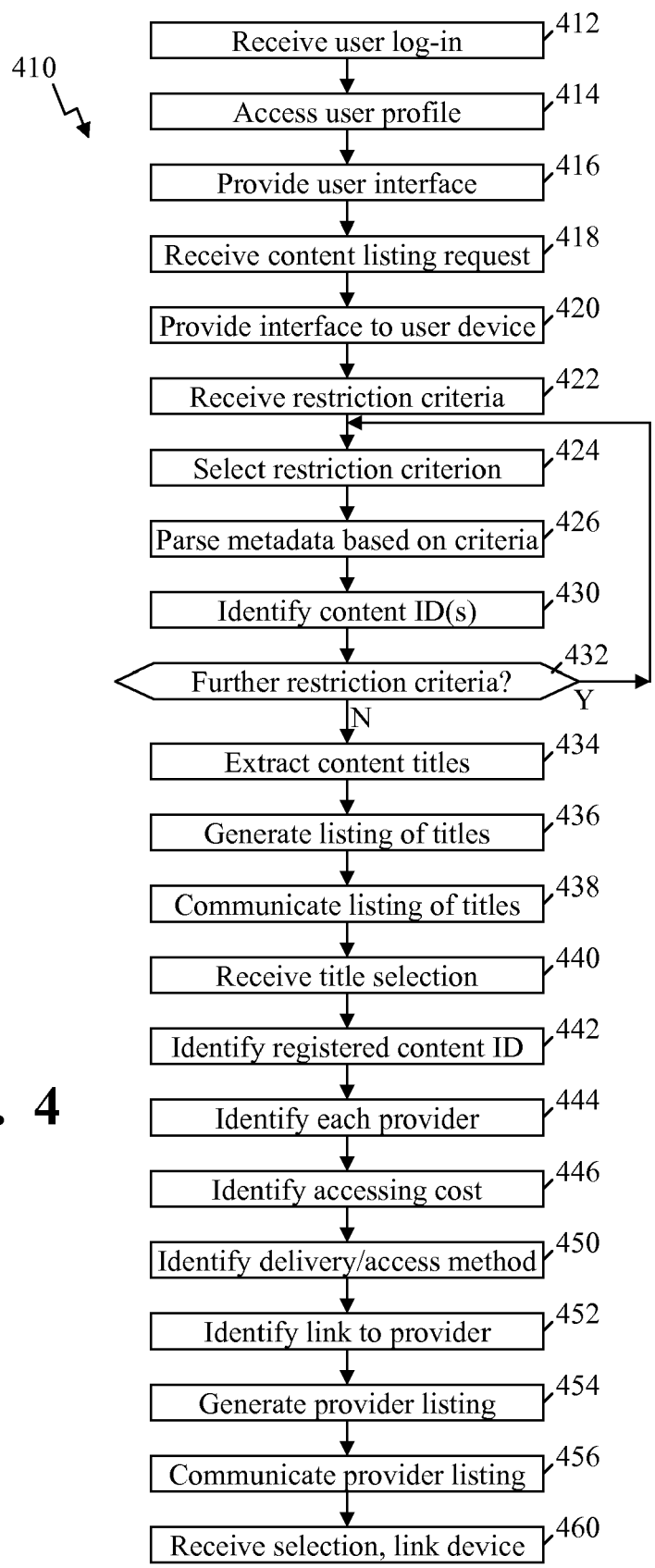
FIG. 4 depicts a simplified flow diagram of a process for use in generating a listing of content providers from which a user can access and/or acquire desired content in response to a request from a user device.

FIG. 4 depicts a simplified flow diagram of a process 410 for use in generating a listing of content providers 114 from which the user can access and/or acquire desired content in response to a request from a user device 116. As described above, users access the listing service provider 112 in an attempt to identify one or more sources and providers from which the desired content can be acquired. Once a user accurately identifies a desired content the listing service provider 112 generates a listing of potential content providers 114 (when one or more are identified) from which the user can access or acquire the content.

In step 412, the listing service provider 112 receives a log-in from a user device 116. Typically, the log-in is implemented through a log-in web page. In other instances, the log-in can be a program or script executed at the user computer, mobile device or other such device. In step 414, a user profile is accessed when the log-in is accurate, or an error is returned to the user when the log-in is inaccurate. In some embodiments, the user log-in in step 412 and the user profile of step 414 can be optional or excluded. The listing service provider 112 may operate without a user logging-in, but may provide some benefit for users that do log-in, such as addition information, added coupons, access to additional or bonus content, and the like. Additionally or alternatively, instead of a user having to explicitly login, the listing service provider 112 may also recognize users and user devices 116 based on tokens, "cookies," Internet location or addresses, or other such information stored on the user devices and/or supplied through the communication network(s) 118.

In step 416, a user interface is provided to the user for implementing a search for desired content. Again, this user interface can be supplied as a web page, implemented through a script at the user device or such implementation. In step 418, a request is received for a listing of content. Some embodiments further include optional step 420, where a search interface is provided to the user device 116 that allows the user to designate restriction criteria, search criteria, search parameters and/or other limitations (including search terms, categories, title, genre, class, era/year, studio, actor(s), director(s), producer(s), subject(s), etc.). This search interface can be provided as a web page and/or implemented through a script at the user device 116. In step 422, one or more restriction criteria to limit or restrict the listing of content is received.

In step 424 a first restriction criterion is identified and/or selected from the one or more restriction criteria received from the user device 116. In some instances the restriction criteria may have some priority and/or the user may designate some priority so that evaluation and searching of content relevant to the restriction criteria is based in part on the priority. This priority can be substantially any priority and again in some instances may be based in part by a priority designated by the user. In step 426, metadata associated with registered unique content IDs are accessed and parsed based on the one or more restriction criteria designated by the user. Again, the content IDs are identifiers registered with the listing service provider 112 and represent one of the content listed in the listing of content that can be accessed from one or more registered content providers.

In step 430, one or more content IDs are identified that satisfy the restriction criteria as designated by the user and recorded. In step 432 it is determined whether further restriction criteria are to be evaluated. In those instances where further restriction criteria are to be evaluated the process 410 returns to step 424 to select a subsequent restriction criteria and to step 426 to search metadata of content IDs. It is noted, however, that the subsequent implementation of step 426 is limited to those content ID that were identified based on the one or more previous searches performed based on subsequently selected restriction criteria. As such, implementing the subsequent evaluations in step 426 based on successive restriction criteria typically results in a reduction in the number of identified content ID. Additionally or alternatively, in some implementations multiple restriction criteria can be used during a single implementation of step 426.

In step 434, content titles or other identifier(s) for each of the one or more content IDs identified as satisfying the restriction criteria are copied from the metadata associated with each identified content ID. In step 436, a listing of the identified content titles is generated, where each identified content title corresponds with at least one of the identified content IDs. In some embodiments additional relevant information and/or characteristics of the content associated with each identified content ID also can be retrieved from the metadata and included in the listing of identified content titles. This additional information can include, but is not limited to, a genre, a classification (e.g., movie, music, cartoon, game, book, etc.), one or more actor(s) or artists associated with the content, a time of release of the content associated with the content ID, a studio that released the content, a format of the content (e.g., high definition, standard, altered, etc.), a sequel number (if relevant), writer(s), director(s), and/or other such relevant information that may help the user in identifying the desired content and/or distinguishing content IDs.

In step 438, the listing of identified content titles (and other relevant information when appropriate) is communicated from the listing service provider 112 over the distributed communication network 118 to a requesting user device 116. In some instances, the listing of identified content titles is communicated in a web page or communicated to be incorporated within a user interface. Further, in some instances links and/or user options, buttons or selections can be defined within the listing that allow a user to make selections directly from the listing, such as selecting a desired title (e.g., using a mouse, keyboard or the like). Additionally or alternatively, in some embodiments the list can be sequentially numbered and each entry in the listing can be associated with a number, such that the user is able to type in the desired number corresponding to the desired entry. In step 440, a selection of one of the listed titles is received from the user device 116 over the distributed network 118 in response to the communicated listing of titles. Through the use of the unique content IDs users can unambiguously specify or identify content and avoid content that may be related but is not the desired content as well as related products, information and the like that many searches may include in a listing. In some embodiments, more than one entry from the listing may be selected at a time and returned to the listing service provider 112.

Step 442 is entered in response to receiving the selection of the content title where a registered unique content ID is identified that corresponds exclusively with the selected content title. In step 444, metadata directly associated with identified content ID is evaluated to identify each content provider 114 registered with the listing service provider 112 that has registered to provide users with access to the selected content that corresponds with the identified content ID. In some embodiments, step 444 further includes implementing a search of a user log file identifying previously acquired content, or user profile (where previously acquired content may be tracked) may also be search. Additionally or alternatively, step 444 may include implementing a search at the user device 116 (and/or peripheral devices coupled with and/or associated with the user device) to determine whether the content associated with the content ID has already been acquired and/or stored at the user device 116. This search at the user device 116 may be implemented through a script or program recorded on the user device 116. Still further in some alternative or additional embodiments, one or more external registered listings may also be searched for content providers. For example, a secondary listing service may register their listing(s) with the listing service provider 112 allowing the listing service provider 112 to search the secondary listing for potential content sources. Furthermore in some embodiments, a network search can be performed in attempts to identify non-registered content providers. This search for non-registered content providers may be based on the unique content ID, or in some instances may be based on restriction criteria (e.g., title, actor, director, etc.). The non-registered content sources, in some implementations, can be distinguished in any listing of content providers supplied to the user device 116. This search of non-registered content sources, however, may be implemented as a subsequent search when no registered content sources are identified, when no content source is identified that supplies the content through a predefined method of delivery, based on user instructions or the like.

In step 446, a cost associated with a user accessing the desired content is identified and/or determined for each content provider identified in step 444 and/or for each method of delivery from each content provider. In step 450 a method of delivery or providing the user with access to first content is identified for each of the identified content providers registered to provide users with access to the content associated with the identified content ID. In step 452 a link over the distributed network is determined for each of the identified content providers registered to provide access to the content associated with the identified content ID. In some instances, a phone number, fax number, email number, street address and/or other information may be alternatively or additionally provided to allow the user to contact the content provider (e.g., in some instances a content provider may not have an associated network link).

In step 454 a content provider listing is generated comprising a listing of each of the identified content providers and the corresponding cost, method of deliver or access, and link/access. In those embodiments where the user device 116, a user log and/or user profile are searched, as described above with respect to step 444, the user device 116 may also be listed as a source of the content (a location (e.g., file path) on the user device may also be provided). Other information about one or more of the content providers 114 can also be provided. For example, in some instances user rankings of one or more of the content providers 114 can be included. This ranking can be based on prior users' rankings of their respective experiences with the particular content provider. Further in some embodiments, an indication of whether the listing service provider 112 has coupons that can be redeemed with one or more content providers 114 can be included in the content provider listing. Additionally in some implementations, the listing can be organized. For example, the listing may be divided based on methods of delivery (e.g., pay-per-view, cable broadcast, etc.), according to pricing, rankings by other users, combinations of organizing and/or other such organizational schemes. The organization of the listing may be selectable by the user (e.g., the user may request the listing be organized by method of delivery, by pricing, or other such organization or combinations). Further, some embodiments incorporate into the listing additional information, listings or options of listings for additional information or services from one or more service resources 124 that are registered with the listing service provider 112 and associated with the identified content ID.

In step 456 the listing of content providers is communicated over the distributed network 118 from the listing service provider 112 to the requesting user device 116. In some instances the listing further identifies how the user can access the identified providers and/or may provide options to link through the listing service provider 112 to a content provider 114. For example, optional step 460 may be included that receives a selection of one of the listed content providers and links the user device 116 to the selected content provider (e.g., by activating an Internet browser on the user device 116 to access a web site of the selected content provider, or other such methods of linking).

The listing service provider 112 thus allows a user to gain access to a listing of content providers for a specific content that is directly associated with a unique content ID while limiting the listing to relevant content. In some instances, the listing service provider 112 allows a user to find content based on a catalog of content and/or content providers registered with the listing service provider. Based on this listing a user can then comparatively shop for the desired content by comparing the content providers along with other aspects such as pricing, methods of delivery of the content, ratings (e.g., as provided by other users that had previous interaction with content providers as described further below), and other such factors. It is noted, however, that the listing service provider 112 typically does not provide desired content to the user. Instead, the listing service provider 112 provides an avenue or method of obtaining an accurate listing of providers that can provide the user with the desired content or access to the content. Again, the listing service provider 112 limits the list of content providers supplied to the user to those content providers 114 that have registered with the listing service provider 112 as a source for a specific content that is directly associated with the unique content ID.

Figure 5:
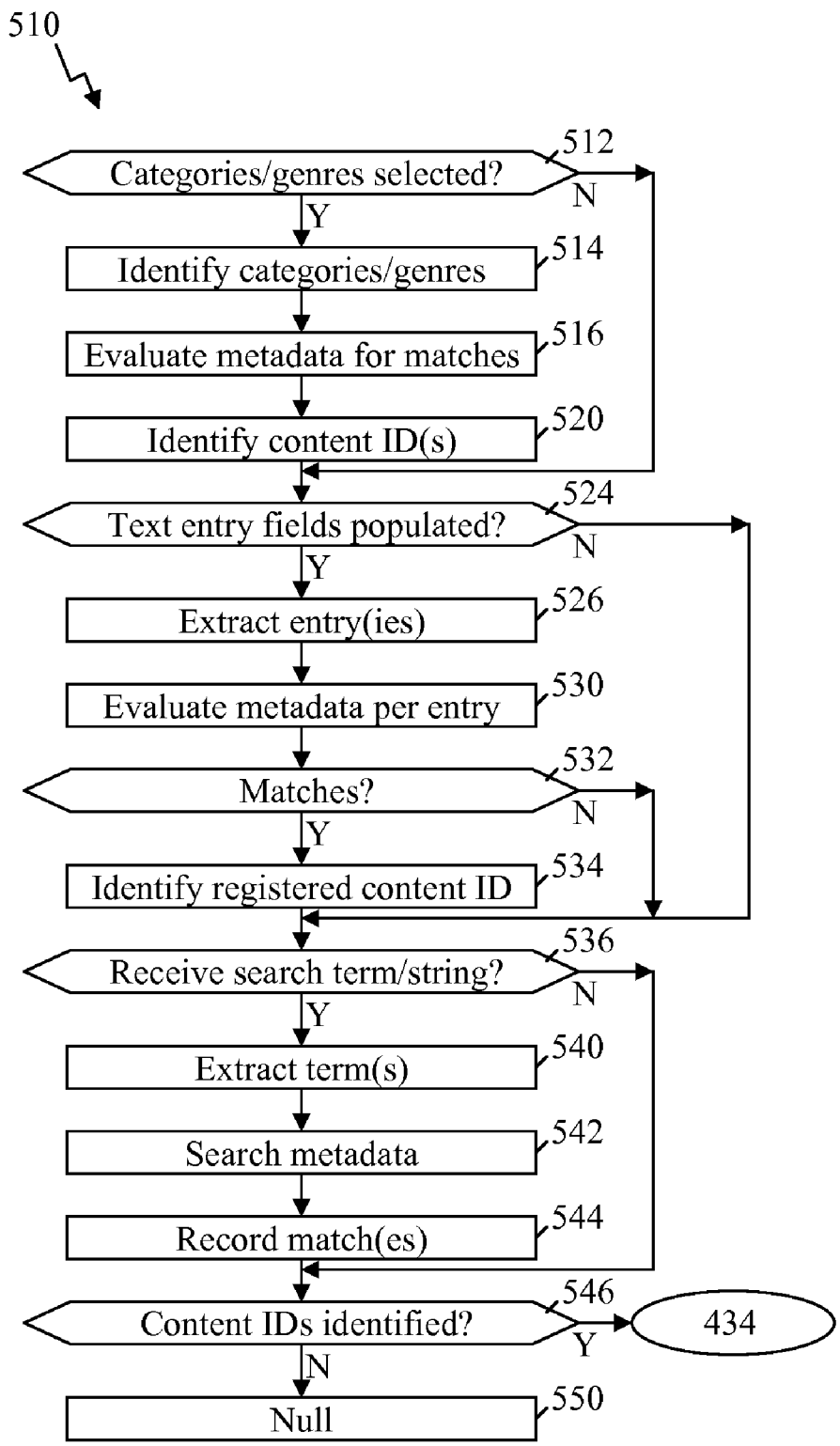
FIG. 5 depicts a simplified flow diagram of a process according to some embodiments for receiving and evaluating restriction criteria in searching one or more databases of content and metadata associated with the registered content to identify content titles that a user is attempting to locate.

FIG. 5 depicts a simplified flow diagram of a process 510 according to some embodiments for receiving and evaluating restriction criteria in searching one or more databases of content and the metadata associated with the content to identify content titles that a user is attempting to locate. Further, the process 510 may be employed in some instances to implement steps 422, 424, 426 and 430 of the process 410 of FIG. 4.

In step 512 it is determined whether one or more categories and/or genres are selected. In some implementations this is achieved by providing a first restriction criteria user interface, menu and/or web page (referred to below generally as user interface) with broad and general categories. Upon a selection of one or more of the categories and/or genres (e.g., by a user selecting one or more boxes in the interface associated with the categories and/or genres and then selecting an "enter" or other relevant selection) the selected categories and/or genres are forwarded to the listing service provider 112. The categories and/or genres can be substantially any relevant categories and/or genres. For example, the categories may include movies, music, television, performances, sports, theater, concerts, books, and other relevant categories. The genres similarly can include substantially any relevant genres, such as but not limited to science fiction, western, fantasy, drama, mystery, cartoon, children, comedy, rock and roll music, classical music, alternative music, country western music, blues music, jazz music, and other relevant genres.

In those instances where one or more categories and/or genres are selected step 514 is entered to identify the selected one or more categories and/or genres. In step 516 metadata of registered content IDs are evaluated to determine whether any metadata matches the selected categories and/or genres. When one or more matches are detected the process continues to step 520 to identify one or more registered content IDs associated with the metadata that included matches with the selected categories and/or genres and record or buffer those identified content IDs. Following step 520 or following steps 512 when a selection is not received, the process 510 continues to step 524.

In step 524 it is determined whether one or more limited text entry fields is populated and/or filled in. These text entry fields may be provided on the same user interface with the selectable categories and/or genres, or may be provided in one or more subsequent user interfaces. In some instances the subsequent user interface may be provided in response to the selections identified in the categories and/or genre user interface. Alternatively or additionally, the categories and/or genre user interface may include one or more text entry fields, and subsequent user interfaces may include text entry fields. The text entry fields provide field where a user through the user device 116 can enter alphanumerical characters. Further, the text entry fields can be labeled and/or associated with specific groups or classes. Some examples of text entry fields can include, but are not limited to, title, actor/actress, author, director, producer, studio, performer, year of release, era, and the like. Additionally or alternatively, one or more of the text entry fields can include a pull-down menu with one or more predefined entries that can be selected to populate the text entry field (e.g., for an era text entry field a pull-down menu may provide options of "1900-1920," "1920-1930," "1930-1940," "1940-1950," "1950-1960," etc.). When it is determined in step 524 that a text entry field has not been filled in the process 510 skips to step 536.

In those instances where it is determined that a text entry field has been filled in step 526 is entered to extract the entry (e.g., word, phase, etc.). In step 530 relevant portions of metadata of relevant content IDs are evaluated for matches to the field entries. In some instances, the relevant content IDs may be limited as a function of the one or more categories and/or genres selected when one or more categories and/or genres are selected. Further, the searching of the metadata may take into account variables, wild cards and the like that are entered into the text entry fields when appropriate. It is determined in step 532 whether one or more matches are found relative to the evaluated metadata. When a match is detected step 534 is entered to identify the registered content ID that is associated with the metadata that provided the match.

The process continues to step 536 following step 534, and following step 532 when it is determined that no matches were detected and following step 524 when a text entry field has not been filled in.

In step 536 it is determined whether a general search term or string is received. Some user interfaces may provide a general search entry field that allows a user to enter one or more alphanumeric characters, Boolean operators and/or other conditions. In some instances, the general search entry field can similarly allow a user to designate categories, genres, groups and additionally or alternatively specific terms associated with those designated categories, genres or groups. The process 510 continues to step 540 when text has been entered in the general search entry field where the one or more terms, and operators or conditions when relevant, are extract. In step 542 a search of the metadata of relevant registered content IDs is performed (again, the content IDs may be limited based on prior searches of metadata based other user selections and/or restrictions. In step 544 it is determined whether one or more matches are found. When a match is found a registered content IDs is identified that is associated with the metadata that matched the search term(s).

Following step 544 and step 536 when text has not been entered in the general search entry field, the process continues to step 546 where it is determined whether any content IDs are identified. In those instances where no content IDs have been identified step 550 is entered where a null result is generated and forwarded to the appropriate user device 116. Alternatively, the process continues to step 434 of the process 410 of FIG. 1 when one or more content IDs are identified such that and the content titles or other identifier(s) associated with each identified registered content ID is retrieved and step 436 where a listing of the identified content titles is generated.

Figure 6:
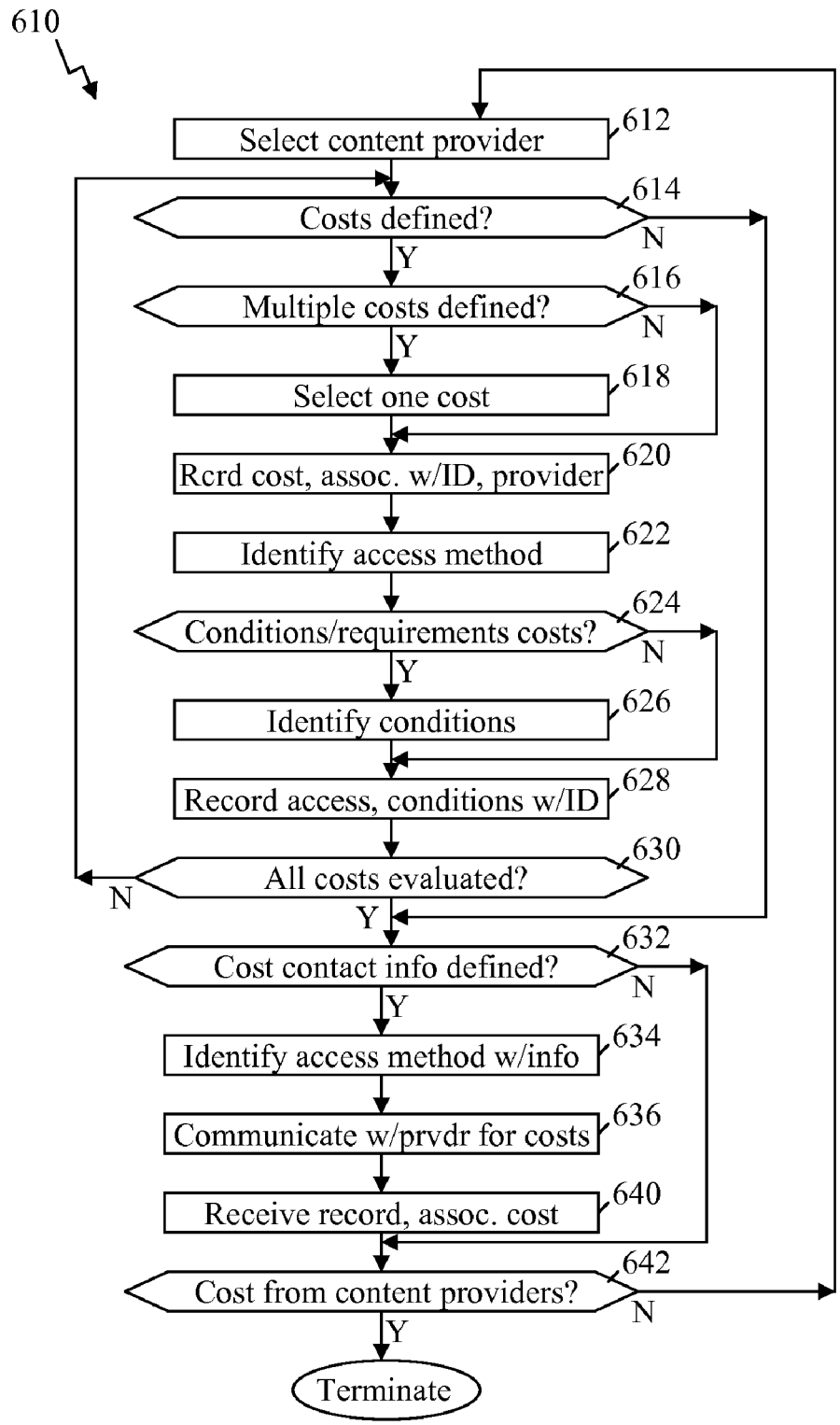
FIG. 6 depicts a simplified flow diagram of a process that is utilized in accordance with some embodiments to determine a cost to a user to access a desired registered content from a registered content provider.

FIG. 6 depicts a simplified flow diagram of a process 610 that is utilized in accordance with some embodiments to determine a cost to a user to access a desired registered content from a registered content provider 114. The process 610 can be employed to implement step 446 of the process 410 of FIG. 4. In step 612, a content provider 116 is selected from the one or more registered content providers identified in step 444 as registered to providing access to the selected content. In step 614 it is determined whether one or more costs are defined within the metadata associated with the identified content ID. In those instances where no cost is specified the process skips to step 632 to obtain cost access information. Alternatively, when one or more costs are specified the process continues to step 616 to determine whether multiple costs are defined. In some instances, a registered content provider 114 can designate multiple costs and specify parameters, requirements and/or conditions to apply when identifying which costs are to apply. For example, the content provider may condition costs based on a location of a user or user device, an account level of a user, whether a user is will to receive the content with commercials and/or how many commercials the user is willing to receive, types of advertisers that would desire to advertise to the identified user (e.g., a user may satisfy a certain demographic (such as age, location, previous purchase history, etc) and some advertisers may be willing to pay a larger premium to direct their advertising to that demographic of users than to others, which may reduce the cost to the user), costs may change over time (e.g., newer movies may demand a premium while older movies may be discounted or free), whether coupons are available, and other such conditions.

In those instances when multiple costs are not specified the process 610 skips to step 620. Alternatively, step 618 is entered where one of the costs (the $i^{th}$ cost) is selected. In step 620, the selected cost is recorded and associate with unique content ID and content provider. In step 622 a method of providing access associated with the selected cost is identified. In step 624 it is determined whether the selected cost is associated with conditions and/or requirements. Again, the content provider 114 may vary the pricing depending on one or more conditions or factors, such as but not limited to, user geographic location, user location on the Internet, user's willingness to have advertising with and/or distributed within the content, a number of advertisements incorporated into content, user profile information, demographic(s) into which a user can be designated, a current date and/or other such conditions. When it is determined in step 624 that conditions are applicable step 626 is entered to identify the conditions. In step 628 the method of providing access and conditions and/or requirements when appropriate are recorded and associated with the unique content ID, the selected content provider and the selected cost. In step 630 it is determined whether all costs have been evaluated. In those instances where all of the costs have not been evaluated the process 610 returns to step 614 to select a subsequent cost and evaluate that cost.

When the costs have been evaluated step 632 is entered to determine whether cost contact information and/or a method of contacting a content provider to acquire cost information is defined within the metadata and associated with a selected content provider is specified in the metadata. As described above, in some instances a content provider may require, in some instances, that the listing service provider 112 contact the content provider 114 to request cost information. This allows the content provider to adjust or alter the cost depending on many factors (including the factors identified above) and does not require the content provider to have to change costs designated in the metadata. In those instances where cost contact information is not specified in the metadata associated with a content provider the process 610 skips to step 642.

Alternatively, step 634 is entered when cost contact information is specified in the metadata to identify a method of providing access associated with the defined cost contact information. A content provider may designate different cost contact information for different methods of deliver or access. In step 636 the listing service provider 112 communicates with content provider 114 using the cost contact information to request costs for a user to receive and/or access the content. As described above, the cost contact information typically includes an Internet site address that allows the listing service provider 112 to communicate with the content provider 114 over the distributed network 118 to acquire current cost information at the time a user requests a listing of content providers. Other methods of contacting the content provider, however, can also be employed. In obtaining the cost information the listing service provider 112 may forward relevant information to allow the content provider to determine a relevant cost for the specific user. This relevant information can include, but is not limited to, content ID and relevant portion of user profile. Further, the process of determining a cost based on cost contact information may include forwarding a request from content provider 114 to the user requesting the user to return a response (e.g., a request as to whether the user is willing to take part in a survey (e.g., before and/or after accessing the desired content), whether the user is will to have advertising and/or what types of advertising, whether the user is willing to provide contact information (e.g., email), whether the user is willing to take part in a survey and/or complete a questionnaire, whether the user is willing to receive further communications from the content provider (e.g., subsequent advertising and/or promotional information, such as through email), and other such communications).

In step 640 a cost is received, recorded and associated with the content provider 114 and unique content ID. In step 642 it is determined whether cost information has been obtained from each of the identified content providers or that cost information is not available. In those instances where further content providers are to be evaluated to determine costs the process 610 returns to step 612. Alternatively when cost information is obtained from each of the content providers 114, the process 610 terminates and returns to step 450 of the process 410 of FIG. 4.

Figure 7:
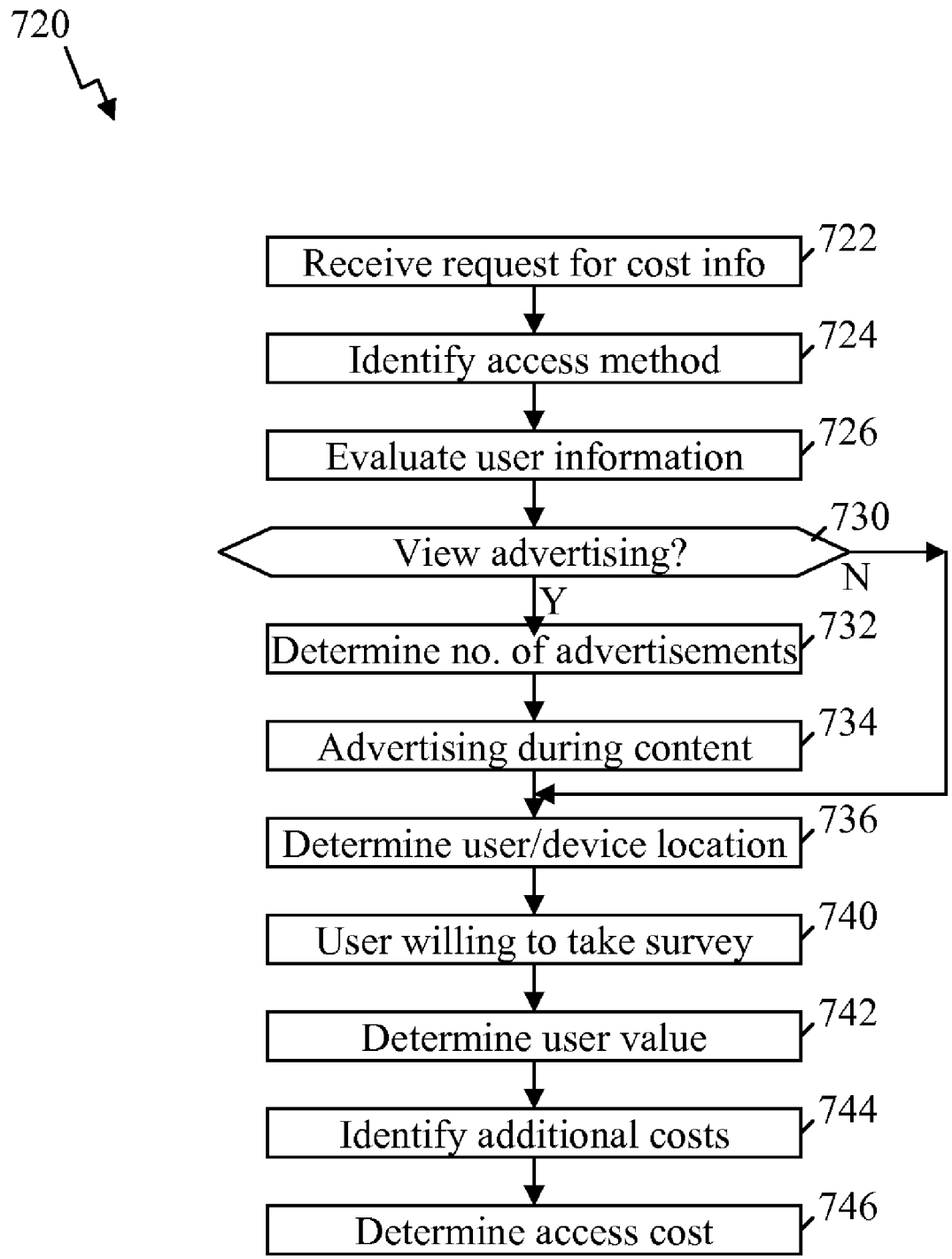
FIG. 7 depicts a simplified flow diagram of a process according to some embodiments as implemented by a content provider in providing cost information for a user to access and/or acquire content through that content provider.

FIG. 7 depicts a simplified flow diagram of a process 720 according to some embodiments as implemented by a content provider 114 in providing cost information for a user to access and/or acquire content through that content provider. In step 722 a request is received for cost information associated with providing a user with access to and/or to acquire content associated with a unique content ID. In step 724 a method is identified by which the content provider 114 is capable of delivering and/or providing a user with access to the desired content associated with the specified content ID. Again, the method of delivery can be through one or more of: streaming content over the distributed network 118, pay-per-view through a satellite provider or cable provider, delivery by postal carry, purchase as a retail outlet, rented at a rental retail outlet or other such methods.

In step 726 an appropriate portion or appropriate portions of user profile information evaluated. In those instances where some or all of the user profile is not provided or a desired portion is not provided the content provider 114 may issue a request for the desired portion from the listing service provider 112. In step 730 it is determined whether the user is willing to view advertising. The determination of whether the user is willing to view advertising is typically determined based on the user profile, by issuing a request to the user or other such determination. In those instances where the user is not willing to view advertising the process 720 skips to step 736. Alternatively, the process continues to step 732 to determine a number of advertisements, an amount of time for advertising or the like that the user is willing to view. In step 734 it is determined whether the user is willing to view advertising during the desired content (or just prior to or following desired content). Again, this determination is typically based on the user profile but may be determined in response to a query to the user from the content provider 114 or listing service provider 112. In step 736 a user's and/or user device's location (geographically and/or on network, cable system, satellite system, etc.) is identified. The geographic and/or network location can allow the content provider to determine whether additional costs may be involved in delivering the desired content, such as taxes that may have to be applied, costs associated with delivering to that area, costs in cooperating with other networks (e.g., utilizing another cable company's cable system to distribute the content) and other such factors. Additionally, the location of the user can be a factor in identifying potential advertisers.

In step 740 identification is made with regard to whether the user is willing to take part in a survey and/or provide other feedback. Again this determination can be based on the user profile or a query to the user. In step 742 a user's value to potential advertisers and/or the content provider is determined. This value can be based on many factors, such as but not limited to, a user's location, location on the Internet, content requested, user's willingness to receive advertising, user's willingness to participate in a survey and/or provide other feedback, demographics with which the user can be associated, user's prior content purchases, prior use of prior issued coupons (issued coupons can be tracked for use), and other such factors or combinations of factors. In some instances, the content provider 114 may additionally maintain a separate user profile, for example, that keeps track of prior purchases, willingness to participate in surveys and other such factors, or this information or some of the information may be maintained in the user profile of the listing service provider. In step 744 additional costs if any that may apply are identified. These additional costs may be dependent on the desired content, method of delivering the content, location of user, location of user device 116 on the network 118, and other such additional costs, including but not limited to taxes, shipping, cost to be paid to third parties (e.g., network provider, cable provider, satellite provider, etc.). In step 746 a cost to provide the user with access and/or to acquire the content is determined and communicated. Again, this determination can be based on many factors, such as but not limited to, the desired content, the date of the desired content, method of access/delivery of content, user's willingness to view advertising and where relative to playback of content, value to advertisers, additional costs if any, in some instances date of request and/or date of delivery, and the like.

As such, the cost of delivery content and/or providing access to content may vary based on many factors, including the content desired and the specific user requesting the content. The determined cost can be forwarded back to the listing service provider 112 in response to a request for a cost, such as in response to the request issued in step 636 from the listing service provider 112 for cost information. The cost determination provided through the process 720 allows content providers to update cost information without having to adjust costs at the listing service provider. Further, the cost determination provides greater incentives for advertisers to advertise with the content provider 114 in that the content provider can target advertising to specific users, types of users or users in a certain area. Further, the cost of advertising with a content provider can vary depending on whether the advertising is incorporated within the content, prior to beginning the content, or at the end of content. The cost of advertising can further be adjusted depending on the types of users, and/or locations of users. The variable costs for advertisers again provide incentives for advertisers to advertise with the content provider 114.

The listing service provider 112 may in some instances provide additional information, features, services and links along with the list of content providers or through separate searches. For example, service resources 124 can register with the listing service provider 112. These service resources can provide services such as critic reviews of movies, music or other content, coupon services that provide coupons for content (e.g., which may be based on viewing advertising and/or participating in a questionnaire), additional content associated with identified content (e.g., a movie studio may register additional movies or content, or bonus content that can be associated with an identified content, which may provide an incentive for a user to select a particular content provider or content), and other such services.

Figure 8:
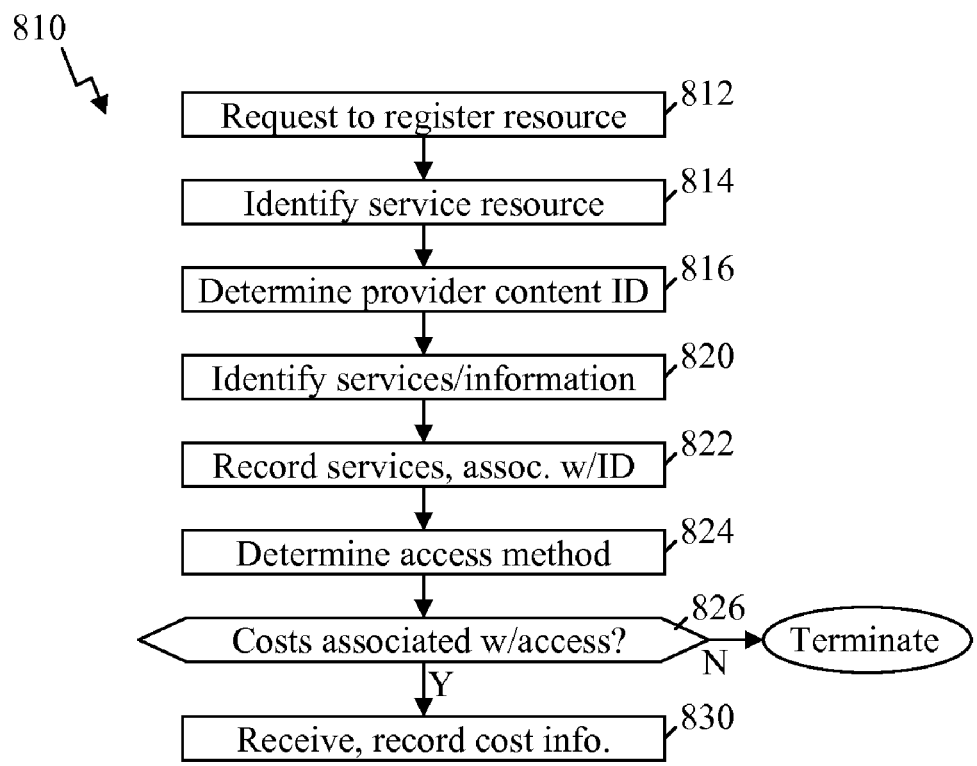
FIG. 8 depicts a simplified flow diagram of a process of registering a service resource with the listing service provider according to some embodiments.

FIG. 8 depicts a simplified flow diagram of a process 810 of registering a service resource 124 with the listing service provider 112. As described above, in some embodiments one or more service resources 124 may additionally register with the listing service provider 112 in order to provide users attempting to identify content providers 114 can potentially receive additional information and/or services directly associated with the content ID determined by the listing service provider 112 based on user selections and/or designations (e.g., as identified in step 442). These service resources 124 can provide, for example, reviews of the desired content associated with the specific content ID, listings of other related content (prequels, sequels, other movies containing one of the actors of the desired content, other movies by the director of the desired content, other movies based on novels by the author of the desired content, and the like), listings of other content accessed by other users that also accessed the desired content, sales of products associated the desired content (e.g., movie posters, figurines, sound tracks, toys, and other such products), and other such services.

In step 812 a request to register a service resource is received. In some instances, the request can be based on a selection of an option in a web page provided from the listing service provider. In step 814 an identity of the service resource 124 is determined. This determination can be based on a response to an inquiry by the listing service provider 112, based on a network address, a unique service resource identifier or other such determination. In some embodiments, the listing service provider 112 may verify the requesting service resource to confirm that the service resource is a valid service resource.

In step 816 unique content ID for which the service being provided by the service resource 124 is determined. This determination may be similar to the determination performed in the process 410 in determining the content ID for desired content that a user wishes to access or acquire. In step 820 a determination of the services and/or information provided by the service resource 124 is determined. In some embodiments, the listing service provider 114 may issue a web page with a user interface that allows the service resource to select one or more options of services. In step 822 the listing service provider 112 records listing service resource identification and the one or more services, and associates the service resource identification and service(s) with the content ID. In step 824 a method of accessing the service is determined, recorded and associated with the unique content ID and the services. As with the methods of accessing and/or acquiring desired content, the methods of accessing services can be via the distributed network 118, by telephone, direct mailing, emailing or other such methods. In step 826 it is determined whether costs are associated with accessing the service resource 124. For example, a user may have to pay a fee to receive a review of the desired content and/or get a listing of related content. In those instances where a cost not needed the process terminates. Alternatively, when a cost is involved, step 830 is entered to receive the cost or method of accessing the cost information, and record and associate the cost information with the unique content ID and the service.

A listing of service resources 124 can be identified along with the listing of content providers 114 (e.g., in step 454) once a content ID is identified by the listing service provider 112 and the metadata associated with the content ID is evaluated to identify that one or more service resources 124 are registered and associated with the specific content ID. In some embodiments, a separate option that is selectable by a user can be provided in a user interface and/or web page, such as a "Service Resource" button, that upon selection by a user provides the listing of one or more service resources 124 associated with the identified content ID. Further in some instances, the "Service Resource" button may not be displayed or is not selectable when no service resources 124 are associated with the identified content ID.

Figure 9:
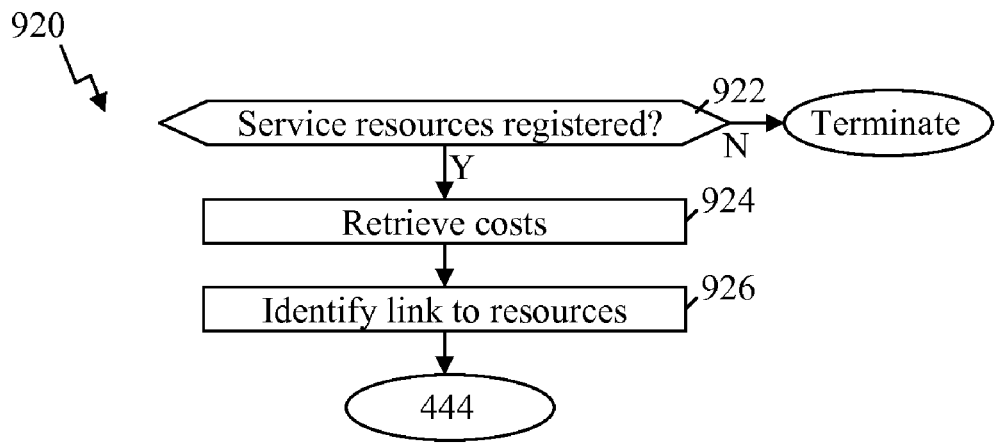
FIG. 9 depicts a simplified flow diagram of a process of identifying and displaying service resources.

FIG. 9 depicts a simplified flow diagram of a process 920 of identifying and displaying service resources 124. In some embodiments, the process 920 can be implemented as part of step 444 of FIG. 4. In step 922, metadata exclusively associated with the identified content ID (e.g., as identified in step 442) is evaluated to identify whether one or more service resources 124 are registered with the listing service provider 112 to provide users with additional information and/or services that correspond with the identified content ID. In those instances where no service resources 124 are registered and associated with the content ID the process 920 terminates.

Alternatively, the process continues to step 924 where costs if any are retrieved when defined and associated with a user accessing the service or information provided by the service resource 124. In step 926, a link over the distributed network or other method of contacting the service resource 124 is retrieved for each of the identified registered service resource and a description of the services and/or information provided is retrieved. The process then returns to step 444 such that the listing of service resources 124 is made available to the user. Again, the listing of service resources may be incorporated into the listing of content providers, provided as an option to the user, as subsequent listing or the like. As with the listing of content providers, some embodiments allow the listing of service resources 124 to be organized, such as based on cost, ratings, services or information provided at the like.

The listing service provider 112 provides users with an ability to identify potential sources of desired content and to shop amongst those potential sources to select a desired source according to a user's preferences. These preferences may include the cost of acquiring or accessing the desired content, but can additionally or alternatively include many other factors, such as the method by which the content can be accessed, the time frame relative to when the content can be acquired or accessed, a specific content provider and/or a providers rating according to other users, and other such relevant factors.

Content providers 114 would be motivated to and benefit from registering with the listing service provider 112 as an additional opportunity for the content providers to be exposed to users and/or streams of revenue, content providers can increase potential advertising revenues because of the ability to market to advertisers the benefits of the customized advertising available through the distribution of content, content owners may require the content providers to register as a condition for being allowed to distribute content, the listing service provider may itself be operated by one or more content creators and/or owners (e.g. movie studios), registering may increase the chance of the content being located and acquired through the content provider 114 by prospective users/viewers, and other such factors.

In some instances, the listing service provider 112 can provide the listing service while generating revenue through multiple potential sources. For example, advertisers may pay to advertise on the listing service provider's Internet sites and/or the lists provided to users 116 (e.g., movie studios may pay to advertise new and/or previously released movies), a fee may be collected from each registered content provider 114 to which a user accesses through a listing supplied by the listing service provider 112, a royalty may be obtained from the content provider based on each sale or fee collected from a user accessing the content provider through a listing provided by the listing service provider, registration fees for each content provider may be charged (e.g., a single registration fee for each content provider, a fee for each content that a content provider registers as a provider, content provider accounts that provide a certain number of content for which a content provider can register as a provider, different levels of content provider accounts, and other such registration fees), registration fees may be charged to the service resources, fees collected based on coupons or other such confirmations issued by the listing service provider 112 to the user that allows the user to acquire or access the content (which may further provide the user with a discounted price or cost), and other such revenue streams.

Figure 10:
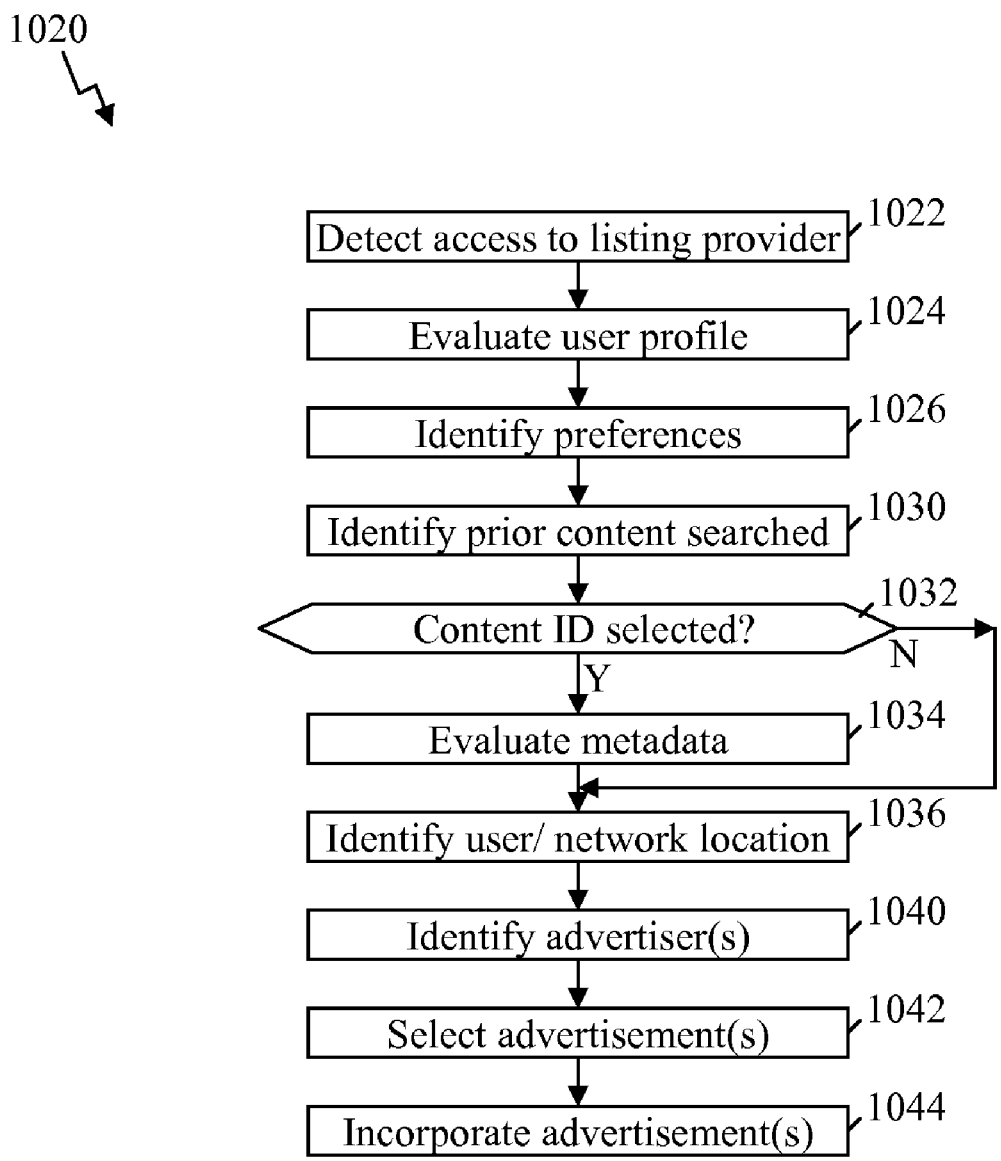
FIG. 10 depicts a simplified flow diagram of a process implemented by the listing service provider to incorporate directed advertising to a user as the user attempts to identify desired content and get a listing of potential content providers.

In some embodiments, the listing service provider 112 can similarly provide directed or customized advertising based on users' profiles, content previously accessed or acquired by users, the content attempting to be accessed or acquired by the users, and other such factors. FIG. 10 depicts a simplified flow diagram of a process 1020 implemented by the listing service provider 112 to incorporate directed advertising to a user 116 as the user attempts to identify desired content and get a listing of potential content providers in accordance with some embodiments. In step 1022 a user is detected as accessing the listing service provider (e.g., through a user logging-in to a user account through the listing service provider's Internet site). In step 1024 an appropriate portion or appropriate portions of a user profile are evaluated. In step 1026 preferences as identified in the user account are identified. These preferences can include types or genres of movies or music the user likes, preferred method of access or acquiring content, and other such preferences. The preferences can be based on a user's designation of preferences (e.g., when populating a user profile) and/or can be based on prior interactions with the listing service provider 112.

In step 1030 prior content for which the user 116 searched is identified. In step 1032 it is determined whether a specific content ID is selected by the user. In those instances where the content ID has not yet been selected the process skips to step 1036. Alternatively, step 1034 is entered to evaluate metadata and/or other information associated with the specific content ID to, for example: identify an owner of the content (e.g., a movie studio or record label); identify one or more content providers registered as sources for the content associated with the selected content ID; identify products and/or services associated with the content (e.g., the content may be a movie where a main character wears a certain type of shoe, and the shoe manufacturer may be defined in the metadata); and other such information associated with the content.

In step 1036 a user's location and/or Internet location are determined. In step 1040 the process identifies one or more potential advertisers based on the information determined through steps 1026, 1030, 1034 and/or 1036. In step 1040 one or more advertisers are identified. The number of advertisers may be based on the number of potential advertisers identified, the amount of advertising space available on a subsequent web page delivered to the user 116, priority of identified advertisers (which can be based on amounts paid to the listing service provider 112, a rotational scheme, or other such factors), and other such factors. In step 1042 advertisements for the selected one or more advertisers are selected. In step 1044 the selected advertisements are incorporated into a subsequent web page delivered to the user.

The selection of advertisers and/or the costs of content to viewers can be based on a value of a user to potential advertisers. Advertisers may indicate the value of potential users to the advertisers, i.e., how much the advertisers are willing to pay based, for example, on certain combinations of features in the user's profile. For example, a retailer or seller of travel clothing may be willing to pay $0.10 for a banner advertisement to users who are in a process of downloading a program related to International Travel; and a Divorce Attorney may be willing to pay $1 for an in-page advertisement to users who earns $1,000,000+, who live in Beverly Hills and are married. The identifying criteria of advertisers are at least in part how much the advertisers are willing to pay for their advertising to be presented to the viewers/users. In turn, advertisers determine the value of the user to them based on information such as location of user, demographic (e.g., age, income, sex, etc.), purchase history, content viewing history, keywords in content stored in the user's home network, and other such factors.

As described above, the listing service provider 112 may receive a percentage of the cost for content or a royalty from the content provider 114 for directing users to the content providers. In some instances, the listing service provider 112 provides the user with a confirmation or coupon that the user can apply when accessing the content provider. The use of the confirmation or coupon can be tracked by the content provider 114 and/or listing service provider 112 to determine payments for the content provider 112 to the listing service provider. In some instances, the user's pay for the content and/or access to the content through the listing service provider 112 and the listing service provider then forwards the payment minus a percentage or royalty to the content provider 114. Typically, however, the listing service provider 112 does not receive payment for the content, but instead, simply provides the users with the ability to competitively shop content providers 114.

The listing service provider 112 provides users with a list of possible sources for the requested content, along with costs of acquiring or accessing the item from each source and type of delivery. In some instances, the listing can provide additional information, such as but not limited to nature and/or quality of content, a ranking/rating of the source by previous users who have in the past accessed, acquired, watched and/or purchased content or the particular item from the particular source, and/or other such information. Based on these criteria a user can shop between the potential providers and select one content provider to provide them with access to and/or purchase the desired content or item.

In some embodiments, an Internet service is provided through the present embodiments allowing queries by user devices for locations from which an item of content (e.g., audio/video content) may be acquired. The service replies to the user device with identifications and/or locations where the content item exists together with pricing/cost information if any. Further in some instances, the service reply takes into account geographic and Internet location of the user, willingness of the user to watch advertisements, profile of user, and other such factors in identifying potential sources of content and costs.

While the invention herein disclosed has been described by means of specific embodiments and applications thereof, numerous modifications and variations could be made thereto by those skilled in the art without departing from the scope of the invention set forth in the claims.

What is claimed is:

1. A method for use in identifying one or more sources of content, the method comprising:

electronically receiving, at the listing service provider and from over the distributed network, a request to access a listing of content;

receiving and identifying at the listing service provider restriction criteria comprising restriction criteria corresponding to a method of delivery and cost to access content;

evaluating, in response to the identifying of the restriction criteria, a plurality of metadata associated with registered content identifiers, where each registered content identifier is register with the listing service provider and represents exclusively one content that is different than the content represented by the other registered content identifiers and is a unique identifier of the represented one content;

identifying, in response to the evaluating of the metadata, as defined within the metadata each registered content identifier that satisfies the restriction criteria;

identifying content titles associated with each of the identified registered content identifiers having metadata that satisfied the restriction criteria;

compiling a first listing of the identified content titles, with one content title corresponding with one of the registered content identifiers;

communicating the first listing of identified content titles over the distributed network;

receiving, in response to the communicating the first listing, a first selection from over the distributed network, where the first selection comprises an indication of a selected first content title of the first listing of the identified content titles where the first content title corresponds to the first content;

identifying, in response to the received selection of the first content title, a first registered content identifier corresponding exclusively with the selected first content title;

evaluating a first metadata of the listing service provider where the first metadata is directly associated with the first registered content identifier, and identifying from the first metadata multiple content providers registered with the listing service provider as sources to provide to one or more users the first content that corresponds with the first registered content identifier;

identifying, for one or more of the multiple identified content providers, a cost to a user to access the first content, and a link over the distributed network to access the corresponding content provider;

generating a listing of content providers comprising a list of each of the identified multiple content providers and their corresponding costs and links; and communicating over the distributed network the listing of content providers such that the multiple identified registered content providers are configured to distribute the first content.

2. The method of claim 1, wherein the identifying the cost further comprises:

determining that cost contact information is defined within the metadata for a first content provider of the identified multiple content providers such that the cost contact information is specifically associated with obtaining a cost to acquire the first content from the first content provider;

accessing over the distributed network, in response to determining that the cost contact information is defined, the first content provider in accordance with the cost contact information;

forwarding, in response to accessing the first content provider, the first registered content identifier to the first content provider; and receiving, over the distributed network in response to forwarding the first registered content identifier, the cost information associated with the first content provider in providing a user with access to the content associated with the first registered content identifier.

3. The method of claim 2, wherein the identifying the cost further comprises forwarding information about a requesting user regarding the requesting user's willingness to have advertising cooperated with the first content at a time when the requesting user is provided access through the first content provider to the first content.

4. The method of claim 3, wherein the identifying the cost further comprises forwarding information about the requesting user's location.

5. The method of claim 3, wherein the identifying the cost further comprises forwarding information about the requesting user regarding the requesting user's willingness to participate in a survey.

6. The method of claim 1, wherein the identifying the cost further comprises:

determining that multiple costs are defined for a first content provider in providing a user with access to the first content;

evaluating, in response to the determination that multiple costs are defined, a user profile and identifying parameters defined in the user profile regarding viewing content; and determining which one of the multiple costs to select based on the parameters of the user profile.

7. The method of claim 1, wherein the identifying the cost further comprises:

determining that multiple costs are defined for a first content provider in providing a user with access to the first content;

identifying, in response to the determination that multiple costs are defined, a desired method of delivery for a first user requesting the listing of content providers; and selecting a first cost of the multiple costs specifically associated with the desired method of delivery.

8. The method of claim 1, further comprising:

evaluating a first metadata of the listing service provider corresponding to the first registered content identifier and identifying from the first metadata one or more service resources registered with the listing service provider as sources to provide to one or more users with a service related to the first content and that corresponds with the first registered content identifier;

identifying, for each of the one or more identified service resources, a description of the related service, and a link over the distributed network to access the service resource;

generating a listing of service resources comprising each of the identified one or more service resources and their corresponding links; and communicating over the distributed network the listing of service resources.

9. The method of claim 8, further comprising:

identifying, for each of the one or more identified resource providers, a cost to a user to access the service when a cost is registered, such that the generating the listing comprises generating the listing of service resources comprising each of the identified one or more service resources, their corresponding links and their corresponding costs when a cost is registered.

10. A method of identifying sources from which multimedia content is to be accessed, the method comprising:

electronically receiving, at the listing service provider and from over the distributed network, a request to access a listing of content;

receiving and identifying at the listing service provider restriction criteria comprising restriction criteria corresponding to a method of delivery and cost to access content;

evaluating, in response to the identifying of the restriction criteria, a plurality of metadata associated with registered content identifiers, where each registered content identifier is register with the listing service provider and represents exclusively one content that is different than the content represented by the other registered content identifiers and is a unique identifier of the represented one content;

identifying, in response to the evaluating of the metadata, as defined within the metadata each registered content identifier that satisfies the restriction criteria;

identifying content titles associated with each of the identified registered content identifiers having metadata that satisfied the restriction criteria;

compiling a first listing of the identified content titles, with one content title corresponding with one of the registered content identifiers;

communicating the first listing of identified content titles over the distributed network;

receiving, in response to the communicating the first listing, a first selection from over the distributed network, where the first selection comprises an indication of a selected first content title of the first listing of the identified content titles where the first content title corresponds to the first content;

identifying, in response to the received selection of the first content title, a first registered content identifier corresponding exclusively with the selected first content title;

identifying from a plurality of registered content providers one or more registered content providers registered in association with the registered content identifier corresponding to the first content title to provide users with access to multimedia content directly corresponding to the registered content identifier;

identifying the one or more registered content providers, for the identified content providers one or more costs to access the multimedia content from one or more of the identified registered content providers, and a method of a user to access each of the respective identified registered content providers such that the user can access the multimedia content from the respective content provider;

generating, at the listing service provider, a listing of content providers comprising a listing of the identified registered content providers identified as providing access to the multimedia content corresponding to the first content title, and corresponding with the identified registered content providers the identified corresponding one or more costs to access the multimedia content from the corresponding registered content provider and the method of accessing the corresponding registered content provider; and communicating over the distributed communication network the generated listing of content providers, whereby the listing of content providers is configured to be utilized by a requestor to access the multimedia content corresponding to the first content title from one of the identified registered content providers listed in the listing of content providers.

11. The method of claim 10, further comprising:

identifying one or more registered service resources associated with the identified registered content ID, where the registered service resources are registered to provide a service associated with the multimedia content corresponding to the first content title; and identifying a type of service provided by each of the identified registered service resources and associated with the registered content ID;

wherein the generating the listing of content providers comprises a listing of the identified registered service resources, and for each of the one or more service resources the associated service provided.

12. The method of claim 10, further comprising:

searching the distributed network for non-registered content providers indicating a willingness to provided access to the multimedia content associated with the first registered content identifier;

identifying, in response to the searching the distributed network, one or more non-registered content providers indicating the willingness to provided access to the multimedia content associated with the first registered content identifier; and incorporating the non-registered content providers into the listing of content providers.

13. The method of claim 10, further comprising:

receiving at the listing service provider a request from a first content provider to register an access to the multimedia content corresponding to the first registered content identifier from the first content provider, where the first content provider is configured to provide access to at least the multimedia content corresponding to the first registered content identifier;

identifying the first registered content identifier exclusively associated with the multimedia content;

identifying cost information associated with accessing the multimedia content from the first content provider; and generating and recording to a computer readable medium additional metadata associated with the first registered content identifier, where the generating and recording comprises:

defining the first content provider as being associated with the first registered content identifier and as a source to access the multimedia content; and associating the cost information with the first registered content identifier and the first content provider as a source to access the multimedia content.

14. The method of claim 13, wherein the associating the cost information with the first registered content identifier comprises associating a cost contact with the first content provider and the first registered content identifier, where the cost contact defines a method of contacting the first content provider at a later time to acquire a present cost as defined at the time of acquiring the present cost.

15. The method of claim 1, further comprising:

receiving a request, from a first content provider, to register an access to the first content, where the first content provider is configured to provide access to at least the first content;

identifying the first registered content identifier exclusively associated with the multimedia content;

receiving, from the first content provider, cost information associated with accessing the first content from the first content provider; and generating and recording to a computer readable medium additional metadata associated with the first registered content identifier, where the generating and recording comprises:

defining, in response to receiving the request to register the first content provider, the first content provider as being associated with the first registered content identifier and as a source to access the first content; and associating the cost information with the first registered content identifier and the first content provider as a source to access the multimedia content.

16. The method of claim 15, wherein the associating the cost information with the first registered content identifier comprises associating a cost contact information with the first content provider and the first registered content identifier, where the cost contact information defines a method of contacting the first content provider at a later time to acquire a present cost as defined at the time of acquiring the present cost.

* * * * *